United States Patent [19]
Tabatch et al.

[11] Patent Number: 4,588,210
[45] Date of Patent: May 13, 1986

[54] FOLDING GAME BOOK

[75] Inventors: Jack Tabatch, Rye; Warren Tabatch, New York; Shane Tabatch, Rye, all of N.Y.

[73] Assignee: Peer Group Communications Corporation, Rye Brook, N.Y.

[21] Appl. No.: 599,099

[22] Filed: Apr. 11, 1984

[51] Int. Cl.[4] ............... B42D 15/00; G09B 19/22
[52] U.S. Cl. .................... 283/63 R; 283/49
[58] Field of Search .......... 283/63 R, 106, 56, 49, 283/45; D19/1, 26, 33; 434/322; 273/236

[56] References Cited

U.S. PATENT DOCUMENTS

| | | | |
|---|---|---|---|
| D. 270,072 | 8/1983 | Tobias | D19/26 |
| 1,699,132 | 1/1929 | Buchanan | 273/236 |
| 3,718,348 | 2/1973 | Bellanca | 283/63 R |
| 3,755,921 | 9/1973 | Heller | 434/322 |
| 3,873,092 | 3/1975 | Fagan | 273/236 |
| 4,008,529 | 2/1977 | Yorkston | 434/322 |
| 4,090,717 | 5/1978 | Rossetti | 434/322 |

FOREIGN PATENT DOCUMENTS 2008165  1/1970  France ................. 434/322

Primary Examiner—Paul A. Bell
Assistant Examiner—Paul M. Heyrana, Sr.
Attorney, Agent, or Firm—Blum Kaplan Friedman Silberman & Beran

[57] ABSTRACT

An improved folding game book is provided. Each sheet of the game book has a fold line and each sheet is folded along its fold line to define four panels. A completed game, puzzle, maze or other self contained packaged information is printed on the four panels of each individual sheet. A plurality of sheets are then positioned so that the fold line of each sheet is in engaged alignment with the fold line of the sheets directly adjacent to it, thus forming a package. This package is then secured by joining all sheets together at the fold line with a staple or other suitable fastener. This construction provides a folding game book in which each sheet may be removed from the others and stand alone as at least one game.

6 Claims, 5 Drawing Figures

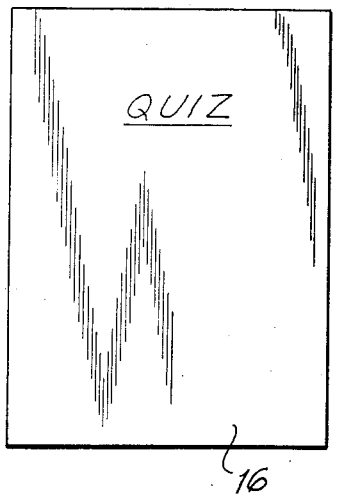
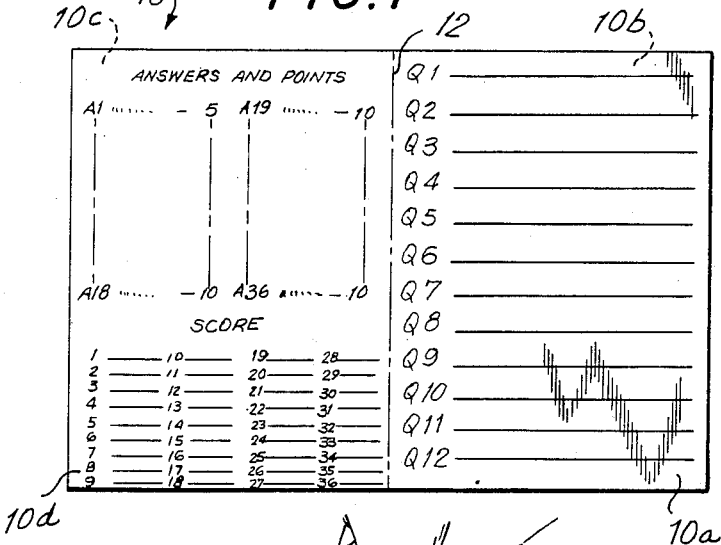
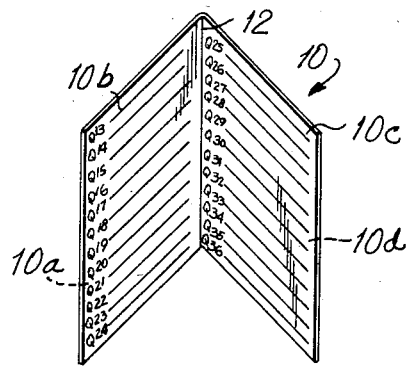
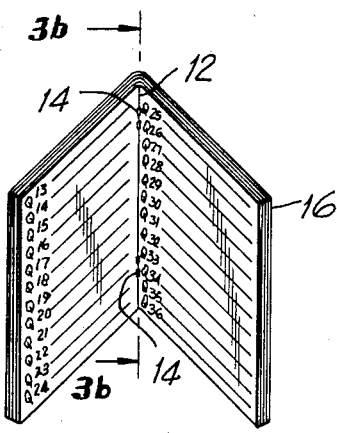
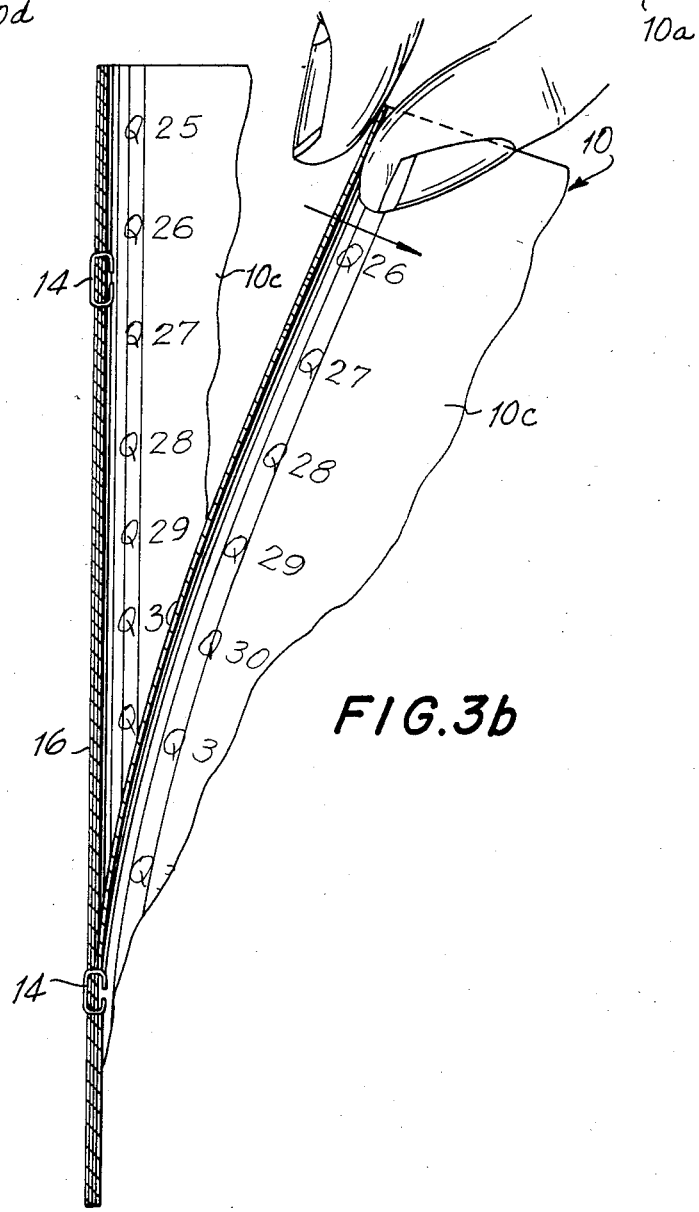

FOLDING GAME BOOK

BACKGROUND OF THE INVENTION

The present invention relates to a game book, and more particularly, to a folding game book in which each sheet may be removed from the others and where each sheet, when removed, contains a complete package of information.

Books and magazines containing puzzles, games, mazes and the like are known in the prior art. However, when games are printed on the pages of a perfect bound book, it is difficult to remove each individual game or puzzle without destroying the book. In addition, when games or puzzles are printed on the pages of magazines, removal of a page torn from the front half of the magazine will loosen a corresponding page in the back half of the magazine. Further, it is difficult to tear individual pages from a magazine without tearing the desired page.

Accordingly, it is desirable to provide a folding game book which overcomes the aforenoted limitations.

SUMMARY OF THE INVENTION

A folding game book constructed in accordance with the present invention has a plurality of sheets. Each sheet has a fold line and each sheet is folded along its fold line to define four pages or panels. A complete game, puzzle, maze, or other self contained package of information is printed on the four panels of each individual sheet. The plurality of sheets are then positioned so that the fold line of each sheet is in engaged alignment with the fold line of the sheets directly adjacent to it in order to form a package. This package is then secured by joining all sheets together at the fold line with at least one staple or other suitable fastener. This construction provides a folding game book.

Thus, an object of the present invention is to provide an improved folding game book.

Another object of the present invention is to provide an improved folding game book wherein individual pages may be removed from the game book without causing damage to the remaining pages.

A further object of the present invention is to provide an improved folding game book wherein each sheet contains four panels and wherein each sheet contains a complete game, maze or puzzle.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a plan view of an unfolded sheet of the present invention;

FIG. 2 is a perspective view of a folded sheet in accordance with the present invention;

FIG. 3a is a perspective view of a plurality of folded sheets bound together in accordance with the present invention;

FIG. 3b is a cross-sectional view taken along line 3b—3b of FIG. 3a; and

FIG. 4 is a plan view of a completed folding game book made in accordance with the present invention.

DETAILED DESCRIPTION OF THE PREFERRED EMBODIMENTS

Referring now to FIG. 1, a plan view of an unfolded sheet used in the folding game book of the present invention is shown. A sheet 10 is generally rectangular in shape. A fold line 12 is described across the surface of sheet 10, partitioning the sheet into two halves. Each half of sheet 10 defines a pair of panels. As illustrated in FIG. 1, one half of sheet 10 describes first panel 10a and second panel 10b, which are on opposing sides of sheet 10, and the second half of sheet 10 describes third panel 10c and fourth panel 10d which are opposed from each other.

Referring now to FIG. 2 a perspective view of a folded sheet is illustrated. Sheet 10 is folded along fold line 12 to produce a singular sheet, four page booklet. In this booklet, first panel 10a and fourth panel 10d represent the front and the back cover, respectively, and second panel 10b and third panel 10c represent the inside pages. In practice, a single quiz, game, maze, puzzle or other unitary package of information may be printed on the single four page sheet as illustrated in FIG. 2. This sheet is complete in itself and requires no reference to other sheets for its use.

Referring now to FIG. 3a, a plurality of sheets 10 identically folded and formed into a booklet is illustrated. The plurality of sheets are positioned so that fold line 12 of each sheet 10 is in communication with the fold line of sheets directly adjacent. After the plurality of sheets have been positioned adjacent to each other, and the fold lines 12 have been lined up, a staple 14 or plurality of staples are used to join the sheets together. It is noted, that an adhesive system or other mechanical fastening device may be used in place of staples 14, provided the fastening device permits the ready removal of the then innermost of sheets 10.

As shown, the resulting construction is a multi-page magazine or book. As noted above each sheet contains a complete game, etc. which is self contained.

Referring now to FIG. 3b it can be seen that when it is desired to remove the then innermost game sheet from the book, the two havles of the sheet 10 are separated from the balance of the book and pulled straight out to release the sheet from staple 14, resulting in a single four page game sheet, and leaving the balance of the game booklet intact. In like manner, the next innermost game sheet 10 may be removed when desired. In this manner, a single folding game book may be used to provide a multiplicity of games or quizzes to a single user or to provide a single quiz to a multiplicity of users.

As illustrated in FIG. 4 a completed folding game book 16 when closed and bound resembles a small book or a magazine and thus may be easily sold and transported.

In a preferred embodiment of the invention each individual sheet 10 is approximately 11 by 8½ inches in dimension. This results in a completed book 16 which is 5½ by 8½ inches in dimension. It is noted, however, that other sheet sizes may be utilized and that it is not necessary for all sheets to be the same size or shape as long as staple 14 passes through all of the sheets binding them together.

In one embodiment of the invention a folding game book is used as a trivia quiz book. The trivia quiz book consists of 20 sheets 10 bound together. Each sheet has a plurality of questions on first panel 10a, second panel 10b and third panel 10c, with lines for the player to write in an answer. An answer list and score sheet are provided on fourth panel 10d. The trivia game book is then bound with a single sheet cover 16 and may be sold on a newsstand or bookstore.

Thus, a folding game book is provided wherein the information printed on each individual sheet results in a unitary package which is complete and independent of the other sheets and a plurality of sheets may be bound together so that when each sheet is removed from the center of the bound booklet it is complete, and another complete sheet is available for removal.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A folding game book comprising a plurality of games and further comprising a plurality of sheets, each sheet having contained thereon one or more complete games, each of said sheets being folded once along a fold line in an identical manner so as to provide each sheet with a first panel, a second panel, a third panel and a fourth panel, said second panel and said third panel being formed on opposite sides of the fold line of each of said sheets from said first panel and said fourth panel thereof, each of said sheets being imprinted to define at least one game independent of the games on said other sheets, said plurality of sheets being positioned so that the fold line of each sheet is in engaged alignment with the fold line of the sheets directly adjacent to it, and affixation means removably joining said plurality of sheets together at their aligned center lines, whereby when each individual sheet is removed from the folding game book, it is a complete and self contained entity.

2. The folding game book, as claimed in claim 1, wherein the information printed on each individual sheet results in at least one game with consecutive information contained in said second and third panels.

3. The folding game book, as claimed in claim 2, wherein the information imprinted on each individual sheet results in at least one game with consecutive information contained in said first, second and third panels.

4. The folding game book, as claimed in claim 3, wherein the information imprinted on said first, second and third panels includes at least questions and its information printed on said fourth panel includes at least answers.

5. The folding game book, as claimed in claim 1, wherein the affixation means is a staple.

6. The folding game book, as claimed in claim 1, wherein the affixation means is an adhesive.

* * * * *